United States Patent [19]

Henis et al.

[11] Patent Number: 4,794,002

[45] Date of Patent: Dec. 27, 1988

[54] MODIFIED POLYMERIC SURFACES AND PROCESS FOR PREPARING SAME

[75] Inventors: Jay M. Henis, St. Louis; Mary K. Tripodi; Donald I. Stimpson, both of Creve Coeur, all of Mo.

[73] Assignee: Monsanto Company, St. Louis, Mo.

[21] Appl. No.: 902,377

[22] Filed: Sep. 5, 1986

Related U.S. Application Data

[63] Continuation-in-part of Ser. No. 794,100, Nov. 1, 1985, abandoned.

[51] Int. Cl.$^4$ .......................... A61K 9/16; B05D 3/02
[52] U.S. Cl. ................................ 424/488; 427/389.9; 427/245; 424/DIG. 7; 424/484; 424/485; 424/486
[58] Field of Search ............... 427/385.5, 389.9, 245, 427/302; 424/488, DIG. 7

[56] References Cited

U.S. PATENT DOCUMENTS

| | | | |
|---|---|---|---|
| 2,165,291 | 7/1939 | Mitchell | 427/245 |
| 3,042,667 | 7/1962 | Flodin et al. | 260/209 |
| 3,373,056 | 3/1968 | Martin | 427/245 X |
| 3,503,789 | 3/1970 | Johnson et al. | 427/245 |
| 3,625,734 | 12/1971 | Ward | 427/245 X |
| 3,772,072 | 11/1973 | Brown | 427/245 |
| 4,066,387 | 1/1978 | Lewin et al. | 427/245 X |
| 4,178,361 | 12/1979 | Cohen et al. | 424/487 |
| 4,230,687 | 10/1980 | Sair et al. | 424/485 |
| 4,245,005 | 1/1981 | Regnier et al. | 428/420 |
| 4,304,799 | 12/1981 | Dankese | 427/245 |
| 4,387,024 | 6/1983 | Kurihara et al. | 427/245 X |
| 4,413,074 | 11/1983 | Wrasidlo et al. | 524/43 |
| 4,432,875 | 2/1984 | Wrasidlo et al. | 210/500.2 |
| 4,450,197 | 5/1984 | Hager et al. | 427/389.8 X |
| 4,505,985 | 3/1985 | Schmidt et al. | 427/302 |
| 4,535,010 | 8/1985 | Axén et al. | 427/246 |
| 4,536,420 | 8/1985 | Rickert et al. | 427/257 |
| 4,624,848 | 11/1986 | Lee | 424/486 |
| 4,713,249 | 12/1987 | Schröder | 424/488 |

FOREIGN PATENT DOCUMENTS

58-092402  6/1983  Japan .................................. 427/245

Primary Examiner—Thurman K. Page
Attorney, Agent, or Firm—Dennis R. Hoerner, Jr.; James W. Williams, Jr.

[57] ABSTRACT

A process for surface modifying a variety of polymeric support surfaces is disclosed in which a predetermined modifying polymer is irreversibly absorbed onto essentially all the surfaces of the support polymer accessible to the modifying polymer. The modifying polymer is selected to impart the desired surface characteristics to the modified polymeric surface.

36 Claims, 3 Drawing Sheets

MODIFIED POLYMERIC SURFACES AND PROCESS FOR PREPARING SAME

This application is a continuation-in-part of application Ser. No. 794,100, filed Nov. 1, 1985 and now abandoned.

BACKGROUND OF THE INVENTION

While in its broadest aspects the present invention provides a process for surface modifying a variety of polymeric support surfaces, it is primarily directed toward new and improved membranes in which a support membrane is modified by irreversibly adsorbing onto essentially all the surfaces of the support membrane a suitable polymeric modifying material.

Membrane modifying processes disclosed heretofore involve depositing a layer of coating material on the membrane by solvent evaporation. In these processes, a solution of the modifying material is applied to the membrane, excess solvent removed from the membrane and the membrane dried to remove the remaining solvent. In some cases a surfactant is added to aid in obtaining a more uniform distribution of modifying material. This results in a modifier on the membrane whose thickness is determined by the amount of solution retained by the membrane and the concentration of the modifier solution. The coating can be stabilized by crosslinking the modifying material during drying. Inherent limitations in these methods are formulating the modifying material to obtain a sufficiently thin, uniform distribution of polymer on the membrane and often having the modifying material concentrated at one surface of the membrane.

DESCRIPTION OF THE INVENTION

In its broadest aspects, the present invention provides a process for surface modifying a variety of polymeric support surfaces by irreversibly adsorbing thereon a suitable modifying polymer which possesses the desired chemical characteristics. For example, a fabric made of a polymeric material such as nylon can be surface modified to increase its ability to wet and thereby render clothes made of such a modified fabric more comfortable. Employing the present process, one can surface modify and render substantially hydrophilic various laboratory and medical devices which often are made of hydrophobic polymeric materials which are undesirably reactive with proteinaceous material. The surface modifications can be further stabilized by crosslinking.

For clarity and brevity in the delineation of the invention, the following description will be primarily directed toward surface modified semipermeable membranes wherein a hydrophobic support membrane is modified by irreversibly adsorbing onto all of the surfaces of the membrane available to it a suitable polymeric material which possesses substantially hydrophilic and/or other desired chemical characteristics. The resulting ultra- or micro-filtration membranes have the mechanical strength of the hydrophobic support membrane and the surface characteristics of the surface modifying hydrophilic polymer. It should be understood that the parameters described below can be employed to surface modify non-membrane polymeric surfaces.

Those skilled in the art recognize the need for surface modified membranes. Indeed, a hydrophilic modifying polymer may have the required chemical characteristics for a particular filtration application but not have the requisite characteristics for fabrication into a useful membrane. For example, dextrans are hydrophilic and exhibit low protein binding but have not been fabricated into strong membranes. Conversely, a polymer may be a good material for constructing membranes but have some undesirable surface interactions in certain filtration applications. For example, polysulfone membranes are autoclavable and strong but are hydrophobic and tend to bind proteins to their surface. Thus, in one aspect the present invention is directed toward surface modification of membranes to create a hydrophilic and/or non-protein binding surface on a strong hydrophobic membrane; introduce reactive groups into a relatively unreactive membrane; and produce ion exchange, reversed phase, or affinity type supports in membrane form. Whereas prior methods for coating membrane surfaces depended upon the orientation of the support membrane, the present process results in an essentially complete surface modification where all surfaces accessible to the ambient solution are coated with a substantially monomolecular layer of modifying polymer.

Support membranes can be made of essentially any hydrophobic polymeric material capable of being fabricated into a relatively strong membrane. Particularly, appropriate support membrane for surface modification by irreversible adsorption can be made from a number of hydrophobic polymers, such as polysulfone, polyethersulfone, poly(2,6-dimethyl, 4-phenylene oxide) and derivatives thereof, polyamides, polyimides, polyetherimide, polypropylene, polyethylene, polyvinylidene fluoride, and the like. It should be understood that suitable support polymers may include mixtures and blends of the above polymers as well as other hydrophobic polymers. Particularly preferred polymers for support membranes are polysulfone, polyethersulfone and polypropylene. These membranes should be porous enough on at least one surface such that the modifying polymer can diffuse through the surface pores to treat the interior of the membrane. Support membranes can be macro-void containing or macro-void free. By "macro-void free" is meant that the membrane is lacking of voids greater than about 20 times the pore size of the immediately contiguous portion of the membrane. Many methods for making porous membranes from hydrophobic polymers are known to those skilled in the art of membrane manufacture. These methods include phase inversion using nonsolvents or temperature and the stretching of microcrystalline films. Phase inversion using nonsolvents involves dissolving the polymer in a solvent, forming a membrane sheet or tube by extrusion through a die, and contacting the extruded polymer solution with a liquid which is a nonsolvent for the polymer but is miscible with the solvent. The polymer solution gels and, when the solvent is extracted, a porous structure remains. In the case of some polymers which are not soluble in a wide variety of solvents (e.g. polypropylene), a pore-forming material can be identified which forms a single phase solution when mixed with the polymer in the melt, but which is immiscible with the polymer at lower temperatures. A melt containing a mixture of the polymer and the pore-forming agent, is then extruded through a die at a temperature above the phase inversion temperature, the extrudate is cooled to a temperature below the phase inversion temperature, and the solution gels. The pore-forming agent is then removed by evaporation or washing. Yet another method for forming porous membranes, when the polymer is capable of forming microcrystals, involves extrusion of the polymer melt under conditions which induce the microcrystalline regions to form, then drawing the crystallized film to produce pores between the crystalline regions. These techniques are discussed in more detail in "Synthetic Polymeric Membranes: A Structural Perspective", Second Edition, by Robert E. Kesting, published by Wiley-Interscience (New York, 1985).

The polymeric modifying material is selected such that it possesses the desired chemical characteristics and will irreversibly adsorb onto the support membrane. By "irreversible adsorption" is meant the phenomenon observed when certain high molecular weight polymers in solution are exposed to a surface and the polymer binds to the surface. Following initial washing of excess modifying polymer, the remaining adsorbed polymer is substantially resistant to removal under conditions similar to the adsorption conditions. Factors to be considered in selecting or synthesizing modifying polymers for irreversible adsorption are: (1) A relatively large number of binding sites between the surface and an individual polymer molecule are required. (2) A larger molecular weight polymer will have a larger number of binding sites and, hence, will display more irreversible binding character than a smaller molecular weight polymer. (3) Binding may not be irreversible under conditions that are significantly different from the conditions used during the initial irreversible binding step and it may be possible to remove the polymer by finding a displacing agent. (4) Lower molecular weight polymers will be displaced by larger molecular weight polymers if the substrate allows penetration of both species.

Suitable modifying polymers are non-proteinaceous and have a molecular weight greater than 10,000, such that irreversible adsorption can be achieved. From a practical point of view it has been found that polymers which show no detectable signs of desorption after 2-4 days of washing are suitable for surface modification as described herein. In cases where the modifying surface is not stabilized by crosslinking the molecular weight of the modifying polymer should be larger than the molecular weights of the materials to which the modified surface will be exposed so that displacement will not occur (other factors being equal). The modifying polymer should consist primarily of the molecular groups one wishes to place on the support surface to promote, for example, hydrophilicity but must also contain a sufficient number of groups capable of interacting with the support surface to allow for irreversible adsorption. Binding groups should be selected from molecules which are known to interact with the membrane. In some cases the desired surface groups and binding groups may be the same. For example, it has been found that molecules containing large numbers of hydroxyl groups do not satisfactorily adsorb onto polysulfone from water. The hydroxyl group is not a good binding group for polysulfone because water does not wet polysulfone well. Hydroxyethyl, hydroxypropyl or benzoyl moieties are good binding groups because small molecules containing these moieties wet, and in some cases plasticize or dissolve polysulfone. In the case of polytetrafluoroethylene membranes, a fluorocarbon-type pendant group on a dextran polymer should be a suitable hydrophilic surface modifier. It will become evident to those skilled in the art that the hydrophobic binding between the binding group and the hydrophobic support polymer employed in this invention affords numerous advantages over the previously disclosed methods. Ionic and hydrogen binding interactions taught in the art are more sensitive to variations in pH and ionic strength that frequently occur in biological separation processes.

The number of binding groups required depends on their strength of binding to the support membrane. If a polymer contains N binding groups with individual binding constants of K, the binding constant for the polymer will be $K^N$. If $K^N$ is greater than 10,000 the process is generally considered irreversible, although some combinations of support and modifying materials may exhibit irreversible adsorption with binding constants below 10,000. However, it is usually desirable and possible to obtain binding constants much greater than 10,000.

To determine if a particular degree of substitution of a predetermined binding group is sufficient to result in irreversible adsorption onto the hydrophobic support membrane, one must estimate the binding energy for the binding group. Exemplary binding energies are provided in the text entitled "The Hydrophobic Effect" by C. Tanford, John Wiley (1980).

Alternately, binding energies can be estimated experimentally for a candidate binding group by conducting a "Langmuir binding experiment". In this method a binding group analog is selected which possesses substantially the same chemical characteristics as the candidate binding group. For example, unionized benzoic acid would be considered a good approximation to a benzoyl group on a dextran polymer. However, it is doubtful that this would be true for the same group under ionizing conditions (e.g high pH). The binding energy is then determined by measuring the amount of the binding group bound to the support membrane as a function of concentration. Other parameters such as temperatures, pH or the addition of a third component to the system can also be studied. This data will determine the binding strength of the particular binding group and can be used to determine the particular composition of a suitable modifying polymer as described above.

For example, if one selects a 40,000 M.W. dextran polymer containing 224 glucose residues per molecule and attaches a hydrocinnamoyl group every tenth glucose residue, the modifier polymer would contain a total of 22 hydrocinnamoyl groups. The binding energy of a single hydrocinnamoyl group for a hydrophobic surface can be approximated from that value reported (−2.5 kcal, "The Hydrophobic Effect" by C. Tanford, supra) for the R-group of the amino acid phenylalanine. The binding constant at 25° C. for each hydrocinnamoyl group = exp (4.16) = 64.5. Hence the binding constant for each polymer molecule is $64.5^{22} \simeq 10^{40}$, which is much greater than the threshold binding constant of 10,000 described above. The large binding constant indicates that the polymer should be a suitable modifying polymer if the binding groups can partition into the hydrophobic support material. By "partitioning" is meant movement of the binding group from the bulk phase onto or into the support membrane. Partitioning of the binding groups, in some cases, can be enhanced by increasing polymer chain mobility of the support material, for example, by increased temperature. Adsorption onto a crystalline support polymer such as polypropylene may have to rely on surface features and amorphous areas alone, unless the binding group can insert into the crystalline structure at a temperature below the melting point of the support polymer.

Candidate binding groups include those groups which as small molecules will plasticize the support membrane polymer. Plasticizers are agents which lower the glass transition temperatures of polymers ($T_g$). Determination of $T_g$ is set out in a paper by Takayuki Murayama in *Polymer Engineering and Science*, August 1982, Volume 22, Number 12, pages 788-791. Briefly, the glass transition temperature is determined by substantial and/or abrupt changes in the coefficients of thermal expansion for the amorphous polymer. The temperature at which this change takes place is the $T_g$ of the polymer.

Another factor to be considered when adsorbing a molecule onto the exposed surfaces of a membrane is the size of the modifying polymer in relation to the pore size of the membrane. Obviously, exposing a 100,000 molecular weight cutoff membrane to a 100,000 molecular weight modifying polymer could result in substantially complete blockage of the membrane. Another factor to consider is that a random coil molecule like a modified dextran is likely to "flatten out" when it adsorbs onto a surface and, hence, have smaller dimensions on the surface than in solution. Thus, an approximate estimate of the largest molecular weight polymer suitable for use with a given pore size membrane is needed. Empirically, we have found that a random coil molecule with a hydrodynamic radius which is less than or equal to about one-fifth (1/5) the pore size of the membrane can be used in the modification process without drastically reducing the permeability of the membrane for pure water (i.e. <30%). Larger molecules can be used in the modification procedure; however, small amounts of bound polymer can greatly reduce the permeability of the membrane (i.e. 40% reduction or greater compared to the unmodified membrane). This situation may be desirable in a few specialty applications where a relatively thick modifying surface is required or in instances where non-specific protein adsorption on the unmodified hydrophobic support membrane would reduce the permeability more drastically than the modifier. These observations along with electron microscopic examination of the membranes modified with different molecular weight polymers suggests that the thickness of the modifying layer is substantially on the same order of magnitude as the dimensions of the modifying polymer (e.g. 10-100 nanometers for 40,000 to 4,000,000 molecular weight dextrans).

It has been found that the modification treatment is uniform throughout the wall of the membrane and that the modifying polymer is deposited in a substantially monomolecular layer throughout essentially the entire available surface area as opposed to coated membranes which have been reported to only treat the outer surface of the membrane. (*Ind. Eng. Chem. Prod. Res. Dev.,* 19, 573-580 (1980). This can be most easily demonstrated by dissolving the support membrane with a suitable solvent following crosslinking, as described hereinafter, to leave behind the modifying material in the form of a "snake skin" or "ghost". Microscopic examination of the ghost structure shows that it is a replica of the original membrane and includes the internal as well as surface details of the support membrane.

Although most soluble polymers display some sort of "nonspecific binding" when placed in contact with a surface such binding may not always be sufficient to allow crosslinking. Sufficient binding to allow crosslinking can usually be obtained by following the general rules observed in hydrophobic, ion exchange, reversed phase, covalent chromatography and affinity chromatography. For example, a hydrophobic polymer will bind more strongly to a hydrophobic membrane than a hydrophilic polymer; hydrophobic groups on a hydrophilic polymer will promote interaction with a hydrophobic surface, as in the case of blue dextran (1:57 ratio of hydrophobic: hydrophilic) or hydrocinnamoyl dextran (1:10 ratio) and polysulfone membranes. A "leash" or "spacer arm" may also be necessary to allow better interaction between the binding group on the modifying polymer and the membrane, as is known from affinity chromatography.

Reactive groups incorporated onto the membrane can be used in further surface modification reactions. Membranes modified with hydroxyl containing polymers can be converted into ion exchange membranes by using standard chemistries developed for cellulose resins. For example, chloroacetic acid can be added to the modified membrane under basic conditions to obtain a cation exchange membrane. Amine groups can be incorporated into the modifier via the same chemistry used for crosslinking the modifying layer e.g., one amino group of propane diamine will react with ethylene glycol diglycidyl ether (EDGE) leaving a free primary amine attached to the modifier for subsequent use. Finally, some of the chemistry developed for immobilizing bioactive materials (e.g. proteins, affinity ligands, enzymes) to dextran, agarose and other gel type supports are also applicable to the appropriately surface modified membranes. A major consideration is that the reagents and reaction conditions consistent with the surface modifier must not harm the morphology, or negatively affect the key permeation properties of the support membrane. Examples of appropriate chemistries for further modification of blue dextran (2-3 million molecular weight dextran having about 1 cibacron blue dye molecule for every 57 dextran repeat units) coated polysulfone and/or polypropylene membranes are cyanogen bromide, bisoxirane, periodate oxidation, carbodiimide, hydroxysuccinimide and chloroformate chemistries(polypropylene only). Alternately, one may derivatize the surface modifying polymer to include the desired reactive group prior to coating the support membrane so long as the presence of the reactive group does not interfer with the partitioning of the binding groups of the modifying polymer into or onto the support membrane.

Once a modifying polymer has been selected for a given support membrane, the conditions used when exposing the support membrane to the modifying polymer are important to obtain the most advantageous results from the present process. An important parameter is the concentration of modifying polymer in the solution to be contacted with support membrane. Increasing the concentration of polymer in the modifying solution increases the amount of polymer deposited onto the membrane until some practical plateau value is attained, usually around 10% w/v for 40,000 molecular weight modified dextrans and 5% for 3,000,000 molecular weight modified dextrans. In this way the amount of modifying polymer applied to the membrane can be controlled. Smaller amounts of applied polymer result in smaller changes in the membranes physical properties. In particular, we find the reduction in pure water permeability of a membrane is linearly related to the amount of material bound at the initial portion of the binding curve. Those skilled in the art will recognize, however, that all physical parameters of the resulting membrane are not affected to equal degrees and the desired amount of modifying polymer to be adsorbed onto the surface will depend on the ultimate use of the membrane. For example, we have found that much less of the modifying polymer hyroxpropyl cellulose is required to prevent protein binding to polysulfone than is required to produce a rapidly rewetting membrane.

The present invention provides a process wherein the support membrane does not have to be dried in the presence of the surface modifying polymer. Moreover, uniform deposition of the modifying polymer is enhanced by use of irreversible adsorption phenomenon. By "uniform" is meant that the modifying polymer is disposed in a substantially monomolecular layer on essentially the entire surface area of the support membrane accessible to the modifying polymer. Uniformity may be determined by microscopic and/or chemical methods. Hydrophobic membranes are obtained in the fully hydrated form that often results from the spinning process (the membranes can be soaked in glycerol, dried and adequately rehydrated). The hydrophobic membrane is then soaked in an aqueous solution of the modifying polymer, preferably about 0.1–10% w/v. The particular concentration will depend on the modifying polymer used and the membrane porosity. The adsorption time should be sufficient to permit equilibrium to be reached. Hydrophilic membranes can be placed directly into the modifier solution or rehydrated prior to coating.

In some cases heating may be advantageously utilized to achieve binding of the modifying polymer to the support membrane. In such cases heating the membrane and modifying polymer solution to a temperature between about 40° C. and 100° C. will enhance such binding. Heating to within a temperature range between about 60° C. and 80° C. is preferred. Alternately, binding of the modifying polymer may be enhanced by de-gassing the substrate material. De-gassing of the substrate membrane can be easily accomplished by subjecting the membrane to a vacuum, which is sufficient to promote escape of trapped gas. It is believed that in most cases a vacuum of about 26–28 inches Hg for about 2 to 4 hrs at room temperature should be sufficient to de-gas the substrate membrane. If lower vacuum (i.e. less than 26 inches Hg) is used, longer times may be necessary. Increasing temperature may speed up the de-gassing process to the extent that such temperatures do not damage the membranes.

The resulting modified membranes are then washed with excess solvent (i.e. the modifying solution minus the modifying polymer) for preferably about 5–24 hours to remove excess, noninteractive polymer. The resulting product is a membrane comprising the support polymer all of whose surfaces are modified by adsorption of a very thin layer of the modifying polymer which is believed to be uniform even at the molecular level. If for some reason a sufficient amount of polymer is not absorbed, the membrane can be treated again with a higher concentration of modifying polymer. Conversely, if too much modifying polymer is absorbed it can be removed with a displacing agent (see Example 14) and the membrane re-treated.

The adsorption isotherm of the polymer and the membrane may indicate whether mono- or multi-layer binding is prevalent and can also be used to determine the density of modifying polymer molecules on the surface of the membrane. This analysis can also be used to determine the effect of various physical parameters (i.e. modifying polymer concentration, ionic strength, pH, dielectric constant, etc.) which might be used to vary the surface density of the adsorbed modifying polymer. Support membranes modified in this fashion can take on specific surface characteristics of the modifying polymer, e.g.; hydrophobic polysulfone membranes modified with blue dextran become hydrophilic, as indicated by the fact that they rewet and pass a specific well defined "bubble point test" as described by Brock in "Membrane Filtration: User's Guide and Reference Manual", Science Tech., Inc. (1983). Hydrophobic polypropylene support membranes modified with polyvinylalcohol become hydrophilic and show a reduced binding for a protein that otherwise binds strongly to the unmodified polypropylene membrane; polypropylene membranes modified with blue dextran contain surface hydroxyl groups which can be used in crosslinking and other chemical reactions. The unmodified polypropylene does not show such characteristics.

The membranes modified in this fashion are stable for several months; however, the modifying polymer can be removed by a suitable choice of conditions, (e.g. boiling the blue dextran modified polysulfone membrane in 0.5% sodium dodecyl sulfate detergent removes the modifying polymer.) For many embodiments of the present invention, it is preferred that the modifying polymers be crosslinked to stabilize the modified surface. While in most cases chemical crosslinking agents are preferred those skilled in the art recognize that crosslinking can be accomplished by other means such as irradiation and heating depending on the chemical composition of the modifying polymer. Suitable crosslinking conditions for water soluble, hydroxyl containing modifying polymers are epichlorohydrin or ethylene glycol diglycidyl ether (EDGE) at concentrations of 1–3% v/v and 1–10% in 1N NaOH. The EDGE has an advantage over other cross-linking agents in that relatively high concentration solutions (at least 10% v/v) can be obtained to promote crosslinking without damage to the hydrophobic polymer membrane from undissolved crosslinking agent. After crosslinking, the surface modifier is stable to the conditions that are able to remove the uncrosslinked modifier unless the conditions promote chemical degradation of the modifying polymer or the crosslinking reaction. To obtain stable crosslinking the adsorbing polymer must be present in a sufficiently high density to allow contact between the adjacent polymer molecules on the surface.

In cases where the modified membrane will be exposed to strong displacing agents, the membrane should be washed with these agents after crosslinking to remove any uncrosslinked polymer. This is most likely to be encountered in affinity membrane applications.

The extent of crosslinking can be determined by exposing the membrane to conditions which would remove the uncrosslinked surface modifying polymer (e.g. warm detergent) or by dissolving the membrane in a good solvent for the support material. The crosslinked modifying polymer should be stable to these conditions, otherwise the crosslinking procedure is continued until the desired product is achieved. For example, when a polysulfone membrane, modified with crosslinked hydroxypropyl cellulose, is dissolved in chloroform, a chloroform insoluble "snake-skin" or "ghost" structure is formed which represents the modified surface. Microscopic examination of the structure in fact shows that the "ghost" is a replica of the original membrane's entire surface structure, including all internal surfaces which were accessible to the modifying polymer solution, see Example 14.

The membranes resulting from the surface modification procedures will have a wide range of applications. Membranes can be modified with a hydrophilic, nonionic surface such that they display low levels of protein adsorption. One application where such a membrane would be useful is in the development of a hollow fiber based mammalian cell culture reactor. In this case protein adsorption results in a reduction of membrane performance and can also represent a loss of protein product produced by the mammalian cells. Another application for membranes modified with a hydrophilic polymers is to produce a hydrophilic membrane. Many hydrophobic membranes that are sold for use in aqueous systems are impregnated with a polymeric wetting agent which has to be washed out before use. After the wetting agent is washed out the membrane cannot be dried and successfully rewetted. In this regard the irreversibly bound modifying polymer behaves like a "permanent wetting agent" as it does not come off the membrane by washing and, hence, the membrane can be dried and rewetted several times. Low protein binding membranes have many applications in the biological area where protein solutions must be filtered. In the past, one solution to the protein binding problem has been to use blocking agents (e.g albumin protein or low molecular weight polyethylene glycol). A problem with this method is that the blocking agents are not stable and add contaminating materials to the filtrate (see Millipore Technical Brief #TB004). In this regard, the irreversibly bound polymer behaves like a "permanent blocking agent" as it is designed or chosen so that it does not come off the membrane and contaminate the filtrate. Ion exchange membranes can also be made by surface modification as described herein, to selectively remove certain ionic materials from solution while allowing oppositely charged materials to pass through. Such membranes would be useful in cases where the adsorptive mode of particle capture is required in the filtration process.

Affinity membranes which can be made by surface modification, as described herein, can be used to perform batch type separations with high selectivity and rapid regeneration times. We have made affinity membranes which show selectivities and regeneration times comparable to HPLC type resin systems.

The following examples are included to better elucidate the practice of the present invention. It should be understood that these examples are included for illustrative purposes only and are not, in any way, intended to limit the scope of the present invention.

The general procedure employed in the following examples to produce surface modified membranes is to soak the membrane in a 0.1-10% w/v solution of the modifying polymer for 5-24 hours. A shorter time may be employed if the modifying polymer solution is filtered through the support membrane. The amount of polymer adsorbed onto the membrane is controlled by the concentration of the modifying polymer solution. The membranes are then washed with the same solvent used to make modifying polymer solution. Washing continues until no polymer can be detected in the washing solution above the membrane even when the washing solution is in contact with the membrane for several days. At this point the membrane is ready for use or further stabilization by a cross-linking reaction. Conditions for the crosslinking reaction should be similar to the initial adsorption conditions such that they do not cause significant displacement of the modifying polymer during the reaction.

Crosslinking was assayed by exposing the membrane to conditions which would remove the uncrosslinked surface modifying polymer (e.g warm detergent) or by dissolving the membrane in a good solvent for the support polymer.

Figure 1:
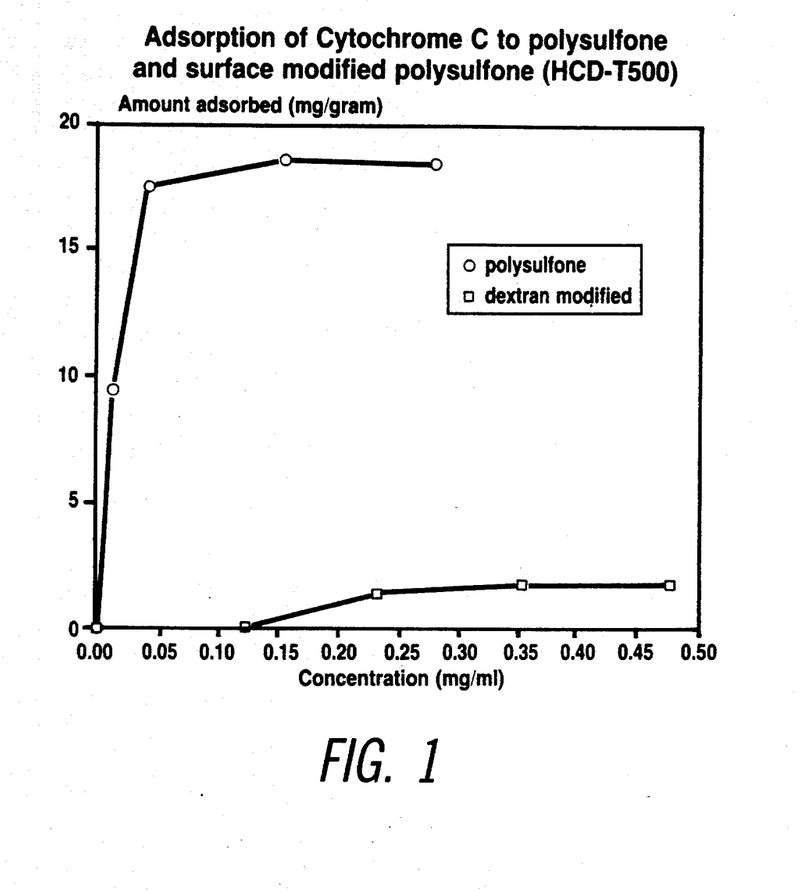
FIG. 1 represents the binding of cytochrome C on the hydrocinnamoyl dextran modified polysulfone membrane of Example 4.

To determine the degree of nonspecific protein binding displayed by a given membrane the hollow fiber membrane was cut into five 1 cm long pieces and these were added to 2-4 ml of protein solution. The protein most frequently used in these studies is cytochrome C. This protein has a relatively high affinity for hydrophobic membranes and, due to its red color, binding can be ascertained by visual inspection. The membranes were always fully hydrated before exposure to the protein solution. The protein concentrations were chosen to span the range of protein bindings from zero to fully saturated. The amount of protein bound to the membrane was determined from the difference between the initial concentration of the protein solution before the membranes were added and the final concentration of the protein solution after equilibrium was attained, about 16 hours at room temperature. Protein concentrations were determined spectrophotometrically. When necessary the dilution of the protein solution by solution trapped in the hollow fiber membrane was taken into account. A typical binding curve is shown in FIG. 1. In other cases, the reduction in protein binding was estimated by visually observing the relative colors of membranes stained with saturating levels of cytochrome C (i.e. 1-2 mg/ml) and comparing these to the color developed by membranes characterized by the binding experiment described above.

In certain cases the amount of protein bound to membranes was measured by using the enzyme alkaline phosphatase. In this method the amount of protein bound to the membrane is determined by filtering a solution of the colorimetric substrate p-nitrophenyl phosphate through the membrane. The amount of protein bound to the membrane can be related to the color developed in the filtrate.

Membranes were tested for hydrophilic character by first performing a bubble point test to ensure the membrane is free from defects and does not allow gas to pass through the membrane below the bubble point pressure. The membrane is then dried by heating at 80° C. or by exposing the membrane to a stream of dry nitrogren gas at room temperature for several hours. The dry membrane, in contrast to the wet membrane, allows gas to pass through the membrane freely at pressures which are orders of magnitude lower than the bubble point pressures. This behavior persists after a dry hydrophobic membrane is exposed to water. However, when a dry hydrophilic membrane is exposed to water it regains the characteristics observed before drying. A similar test is also performed with distilled water. In this case water passes freely through a hydrophilic membrane but does not pass through a hydrophobic membrane until the water intrusion pressure is reached.

EXAMPLE 1

A commercial "macro-void containing" polysulfone membrane with a 0.1 micron pore size rating was soaked in a 1.0% w/v solution of hydroxypropyl cellulose in deionized water for 16 hours. The membraines were then washed with deionized water for 16 hours with agitation. The surface modified membranes were hydrophilic and bound 10 times less protein cytochrome C than untreated membranes. No displacement of hydroxypropyl cellulose by cytochrome C was observed during a 6 month test period. The presence of the modifier polymer on the support membranes can also be detected by using the thin-layer chromatography reagent called "Bial's reagent". The membrane was soaked in this reagent for 30 seconds and then placed in a 70°–80° C. oven for 15–30 minutes. The untreated membranes gave an ash gray color, the treated membranes give a blue color and the intensity was proportional to the amount of modifying polymer bound. Similar results were observed with 100,000 and 300,000 molecular weight hydroxypropyl cellulose polymers.

EXAMPLE 2

The procedure in Example 1 was followed with polysulfone as the support membrane and "blue dextran" as the modifying polymer. (Blue dextrane is a generic name for 2-3 million molecular weight dextran which has about 1 cibacron blue dye molecule for every 57 dextran repeat units). The surface modified membranes were hydrophilic and were stable indefinitely as determined by visual inspection, i.e., the membranes turn blue, the intensity of color remains constant, and no blue dextran was observed in the water solution in contact with the membrane. The water permeability of the modified membrane was about 34% lower than the unmodified membrane. However, the modified membrane regained 70% of its initial water flux after drying at 80° C. for 24 hours. Unmodified membranes do not regain any measurable flux after drying.

EXAMPLE 3

The procedure in Example 1 was followed with polysulfone as the support membrane and benzoyl dextran as the modifying polymer, with the exception that the procedure is carried out at 80° C. The benzoyl dextran had a molecular weight of 70,000 and contained approximately 1 benzoyl group for every 10 repeat units of the dextran polymer. This polymer was made by the reaction of benzoyl chloride with 10% w/v dextran in 1N NaOH at room temperature. The surface modified membrane was hydrophilic as defined above and the presence of dextran on the membrane was indicated by Bial's reagent and were stable for days. The membranes treated with unmodified dextrans (room temp. of 80° C.) or the benzoyl dextrans at room temperature completely lose the dextrans after 6 hours of washing with deionized water as determined by rewetting and Bial's reagent tests.

EXAMPLE 4

The procedure of Example 3 was followed except that hydrocinnamoyl chloride was used to place hydrocinnamoyl binding groups on the dextran polymer. In this case irreversible binding proceeds quickly at room temperature. The surface modified membranes were hydrophilic and the presence of dextran on the membrane was indicated and determined to be stable by Bial's reagent. Similar results were obtained with 40,000 and 500,000 molecular weight dextrans. No measurable decline in water flux was observed with the 40,000 molecular weight polymer while a 10% reduction in water flux was observed with the 500,000 molecular weight polymer. Protein adsorption was decreased to at least one-tenth that of the unmodified membrane as indicated by adsorption of Cytochrome C. See FIG. 1 for 500,000 m.w. hydrocinnamoyl dextran modification.

EXAMPLE 5

The procedure of Example 2 was followed with a 0.2 micron nylon 6,6 membrane. The surface modified membrane was determined to be stable by visual inspection of blue color on membrane and lack of blue color in solution above membrane after 24 hours at 80° C. and then 11 months at room temperature. An untreated nylon 6,6 membrane (0.2 micron) added to the same solution as the treated membrane showed no indication of blue color, indicating that the blue dextran does not migrate from one membrane to another membrane which has equal affinity for the modifying polymer.

EXAMPLE 6

The procedure described in Example 5 was followed with spun bonded nylon fabric (i.e. Monsanto's Cerex material) as the support material. The system was determined to be stable by visual inspection of the blue color of the fabric in continuous contact with water. The treated fabric was determined to be more hydrophilic than untreated fabric by a water bead test wherein a bead of deionized water placed on the untreated material requires several minutes before it is absorbed into the fabric, a drop of water placed on the treated fabric is absorbed immediately.

EXAMPLE 7

The procedure described in Example 2 was followed with 0.2 micron polypropylene membranes as the support material. The modified membranes while not hydrophilic by the previously described tests were stable indefinitely. The hydroxyl groups of the surface modifying polymer can be further derivatized to produce various ion exchange or affinity membranes.

EXAMPLE 8

The procedure described in Example 2 was followed with 10 micron pore size polyethylene as the support material. The treated material was determined to be stable by visual inspection of the blue color.

EXAMPLE 9

The procedure of Example 2 was followed with polyether sulfone as the support polymer. The modified material was stable in water as determined by visual inspection of the blue color.

EXAMPLE 10

The procedure of Example 9 was followed with polyetherimide as the support material. The modified material was stable in water as determined by visual inspection of the blue color.

EXAMPLE 11

The procedure of Example 1 was followed with partially hydrolyzed polyvinyl alcohol (MW≅125,000, 88 wt % polyvinyl alcohol and 12 wt % polyvinyl acetate) as the modifying polymer. The resulting membranes are hydrophilic and show about ten times less Cytochrome C binding by visual comparison with hydroxypropyl cellulose modified membranes both in about 1 mg/ml cytochrome C solution. The stable presence of polyvinyl alcohol is also indicated by the Iodine reagent (i.e. polyvinyl alcohol plus the amber colored reagent of 3 mM iodine+9 mM potassium iodide+0.2M boric acid turns blue). It has been found that 98-99% hydrolyzed polyvinyl alcohol (98-99% of the acetate groups hydrolyzed) 115,000 molecular weight does not show stable adsorption to polysulfone and does not reduce protein adsorption.

EXAMPLE 12

The procedure of Example 1 was followed with hydroxyethyl cellulose as the modifying polymer. The modified membrane is hydrophilic and the hydroxyethyl cellulose is irreversible bound as indicated by extensive washing and testing with Bial's reagent but no significant reduction in cytochrome C protein binding is observed.

EXAMPLE 13

The procedure of Example 1 was followed with 0.2 micron polypropylene membranes and 98-99% hydrolyzed polyvinyl alcohols (98-99% of the acetate groups hydrolyzed) of molecular weights of 14,000 and 115,000. The resulting membranes are hydrophilic and stable as judged by washing and testing with the Iodine reagent (see Example 11) and the rewetting tests described above. The resulting membranes show a significant reduction in cytochrome C protein binding, as determined by visual inspection. The membrane modified with 115,000 mw polyvinyl alcohol exhibited a twenty-four fold reduction in alkaline phosphatase binding as judged by enzymatic assay. The resulting membranes are also more fouling resistant than untreated membranes when used in feed streams that contain materials that can bind to the membranes.

EXAMPLE 14

Figure 2:
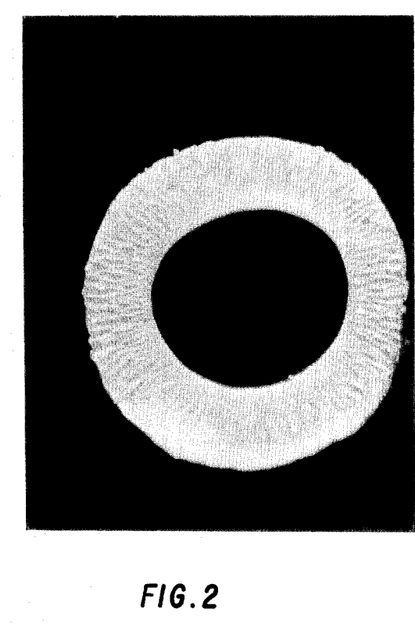
FIG. 2 shows the structure of the modified membrane of Example 14.
Figure 3:
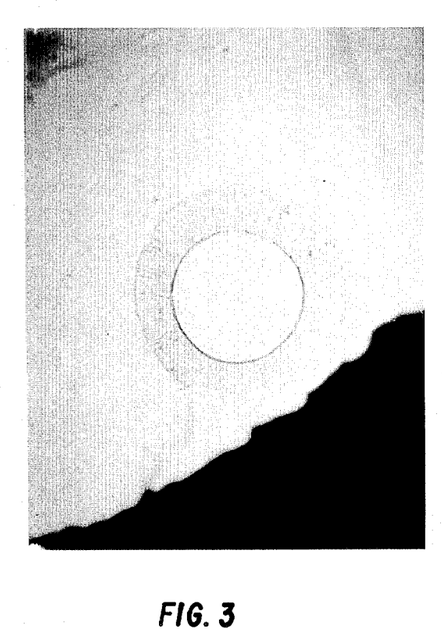
FIG. 3 shows the "short" structure obtained after dissolving the polysulfone support membrane.

The procedure of Example 1 was followed with 1% blue dextran in place of hydroxypropyl cellulose in 1N NaOH solution in place of deionized water. The resulting adsorbed blue dextran is crosslinked by placing the membrane in a 5% (v/v) solution of ethylene glycol diglycidyl ether in 1N NaOH for 16 hours. The membranes are then washed with deionized water. If residual epoxide groups must be removed a further incubation with NaOH is required. The resultant membrane is hydrophilic and is stable, as judged by visual inspection of the membrane's blue color, in boiling 1% w/v Alconox ® (Alconox, Inc., New York, N.Y.) or sodium dodecyl sulfate detergent solutions for several hours (the uncrosslinked blue dextran is removed in 30 minutes by this treatment). The surface modified layer is also judged crosslinked by the "ghost" test, i.e., dissolving the membrane in chloroform results in a blue "ghost" which is stable when the solution is shaken. The uncrosslinked membranes will form the "ghost" structure but it is disrupted when the solution is shaken. FIG. 2 shows the general structure of the modified membrane. FIG. 3 shows the "ghost" structure obtained after dissolving the polysulfone support membrane.

EXAMPLE 15

The membrane of Example 1 was crosslinked by soaking in a 0.5% w/v dimethylolurea crosslinking agent for 30 minutes with agitation and then placed in a 90° C. oven for about 30 minutes. (see "Klucel: Hydroxypropyl Cellulose Chemical and Physical Properties", written Hercules Chemical Co., Wilmington, Delaware, 1971). The crosslinked hydroxypropyl cellulose was not displaced by non-ionic detergents such as TRITON ® X-100 (Rohm & Haas Co.) and NONIDET ® P-40 (Shell Company) at concentrations of 1% (v/v, detergent/water) at 40° C.

The uncrosslinked modified membrane forms a clear solution in chloroform because both polysulfone and hydroxypropyl cellulose are soluble in this solvent. The crosslinked cellulose forms a chloroform insoluble "ghost". The modified membrane is hydrophilic and shows a significant reduction in cytochrome C binding relative to the original polysulfone membrane.

EXAMPLE 16

Polypropylene membranes were soaked in 3% blue dextran in distilled water for 16 hours and washed with distilled water for 16 hours. Water is exchanged for 1N NaOH and ethylene glycol diglycidyl ether (5% v/v) and allowed to sit at room temperature for 16-32 hours to crosslink the modified dextran surface. The membranes are washed in water and then in dry acetone. The dextran surface is thn "activated" by immersing the membranes in 95% acetone, 5% pyridine containing 3% (w/v) p-nitrophenyl chloroformate for 30 minutes at room temperature and then washed and stored in dry acetone. By hydrolysis of the activated groups with 6N NaOH to release p-nitrophenol and measuring the amount released we find as much as 8 mM of activated groups per gram of membrane (dry weight) can be incorporated into the surface modified membrane. The resulting membranes can be use to immobilize amino containing molecules, i.e., proteins. For example, the membrane from this procedure is washing with 1 mM HCl is distilled water for 2 minutes then a 1 mg/ml solution of protein A in 0.05M sodium phosphate buffer-pH 7.0 is recirculated by filtration for 2 hours. The protein A is immobilized on the membrane and will selectively bind antibody protein from a serum containing a mixture of proteins. The activated membranes are stable for several months if kept free from water.

EXAMPLE 17

The membrane from Example 14 was placed in a solution of 50% (v/v) 1,3 propane diamine in 0.5N NaOH and incubated at room temperature for 16 hours immediately after the crosslinking step. The resultant membrane was washed in deionized water then 5 times with alternating 0.1N NaOH, 0.1N HCl for about 30 minutes each. The resulting membranes had 30 mM of amino groups per gram of fiber as determined by the ninhydrin reaction.

EXAMPLE 18

The membranes from Example 17 were reacted with 05M succinic anhydride in 1M potassium phosphate pH 6.0 at room temperature overnight. This reaction was repeated until the ninhydrin test on the fibers was negative (i.e. no blue color observed). As expected, the membrane displayed cation exchange properties.

EXAMPLE 19

The membrane from Example 18 was "activated" for protein immobilization by washing with 5 changes of dry isopropanol and then immersing 19-8 cm long pieces of hollow fiber membrane into 10 ml of isopropanol containing 0.115 gm of N-hydroxy succinimide and 0.19 gm of 1-ethyl-3(3-dimethyl aminopropyl)carbodiimide for 70 minutes at room temperature. The resultant membranes are stored in dry isopropanol until use. For example, 20 ml of water was forced through the hollow fiber membranes, excess water from the membranes was removed and then 5 mg of protein A in 2 ml of 0.05M sodium phosphate pH 6.0 was added and incubated overnight at 4° C. The membranes immobilized 13 mg of protein A per gram of hollow fiber (dry weight) and showed selective binding of antibody protein from a mixture of serum proteins.

EXAMPLE 20

The procedure of Example 1 was followed with a "macro-void free" polysulfone support membrane, diethyl-amino-ethyl dextran (DEAE dextran) as the modifying polymer and 1N NaOH in water as the solvent. Under these conditions the DEAE pendant group is not positively charged and, hence, is hydrophobic enough to ensure irreversible adsorption of the DEAE dextran to polysulfone. The membranes were washed with 1N NaOH and then soaked in 10% ethylene glycol diglycidyl ether in 1N NaOH over night at room temperature to crosslink the DEAE dextran. The resulting membranes are stable in boiling 1% sodium dodecyl sulfate and contain DEAE groups as indicated by potassium iodoplatinate and Dragendorff's reagents (obtained from Sigma Chemical Company, St. Louis, Mo.). In addition, the membranes display anion exchange character, e.g., in 0.06M sodium barbital buffer pH 8.6 the membranes selectively bind c-phycocyanin (negatively charged) over cytochrome C (positively charged) and can be used to purify monoclonal antibodies from mouse ascites fluid by selectively elution with increasing sodium chloride concentrations.

EXAMPLE 21

The anion exchange membrane of Example 20 was used to covalently immobilize the proteins ferritin and c-phycocyanin as follows: the membranes were exposed to solutions of these proteins in 10 mM sodium bicarbonate pH 9 by soaking overnight at 4° C. or by filtration in a dead end mode for 30 minutes to obtain protein binding. The proteins were then crosslinked with a suitable agent to covalently fix the absorbed layer of protein. Ferritin was crosslined with 1% ethylene glycol diglycidyl either or 1% ethylene glycol bis(succinic acid N-hydroxy succinimide ester) in 10 mM sodium bicarbonate pH 9 overnight at room temperature. c-Phycocyanin was crosslinked with ethylene glycol diglycidyl ether under the same conditions. Both membranes were stable to a 1% sodium dodecyl sulfate treatment at 70° C. for 4 hours whereas the uncrosslinked proteins were substantially removed by this treatment. In particular, 72% of the uncrosslinked phycocyanin was removed but only 22% of the crosslinked phycocyanin was removed by the 70° C. 1% detergent treatment.

EXAMPLE 22

The anion exchange membrane of Example 20 was used to create an affinity membrane by adsorbing protein A in 10 mM sodium bicarbonate at 4° C. over night. The resulting protein coated membranes were crosslinked with 1% ethylene glycol diglycidyl ether or 20 mM ethylene glycol bis(succinic acid N-hydroxy succinimide ester) in the same buffer overnight at 4° C. The resulting membranes selectively adsorbed monoclonal antibody from a solution of 10% mouse ascites fluid in 5 mM potassium phosphate pH 8.0, 0.2M sodium chloride and release the antibody when exposed in 0.1M glycine, 0.15M sodium chloride ph 2.6 buffer. The binding capacity of the ethylene glycol diglycidylether crosslinked membrane was substantially lower than the ethylene glycol bis (succinic acid N-hydroxy succinimide ester) crosslinked membrane and, therefore, the latter is the preferred crosslinking agent for this application.

EXAMPLE 23

The procedure of Example 1 was followed with a macro-void free polysulfone support membrane. The modified membrane was crosslinked by soaking in a 10% solution ethylene glycol diglycidyl ether in 1N sodium hydroxide at 60°-80° C. overnight. The crosslinking is repeated (usually twice) until a chloroform insoluble "ghost" is obtained from the membranes. The resulting membranes were converted to cation ion exchange membranes by soaking the membranes in 0.5M sodium methoxide (Kodak Chemical, Rochester N.Y.) for 3 hours room temperature and then soaking in 1M chloroacetic acid in t-butanol overnight at room temperature. The resulting membranes selectively bind cytochrome C and no phycocyanin in 0.06M sodium barbital buffer pH 8.6 and, hence, display cation exchange character.

We claim:

1. A process for surface modifying a predetermined polymeric support material which comprises irreversibly adsorbing a modifying polymer onto substantially the entire surface of said support material accessible to said modifying polymer, said modifying polymer having a molecular weight of at least 10,000 and containing an effective number of binding groups which partition onto or into the support material and adhere the modifying polymer to the support material, and subsequently removing excess non-adsorbed modifying polymer by washing the modified polymeric support material.

2. A process of claim 1 in which the support material is a support membrane.

3. A process of claim 2 in which the irreversible adsorption is brought about by contacting said support membrane with a solution containing said modifying polymer.

4. A process of claim 3 in which the solution contains between about 0.1 and 10 wt % modifying polymer.

5. A process of claim 2 in which partitioning of the binding groups of the modifying polymer onto or into the support membrane is promoted by increasing the chain mobility of the support membrane.

6. A process of claim 5 in which chain mobility is increased by increase in temperature of the support membrane.

7. A process of claim 6 in which the temperature is between about 60° C. and 80° C.

8. A process of claim 2 further comprising crosslinking the modifying polymer following adsorption onto the support membrane.

9. A process of claim 2 in which the hydrodynamic radius of the modifying polymer is less than or equal to about one-fifth the pore size of the support membrane.

10. A process of claim 2 in which the support membrane is made of polymer selected from the group consisting of polysulfone, polyethersulfone, polyetherimide, polypropylene, polyethylene and polyvinylidene flouride.

11. The process of claim 2 in which the support membrane is made of polysulfone and the modifying polymer is hydroxypropylcellulose.

12. The process of claim 11 in which the modifying polymer is crosslinked.

13. The process of claim 2 in which the support membrane is made of polysulfone and the modifying polymer is about 88 wt % hydrolyzed polyvinylacetate.

14. The process of claim 13 in which the modifying polymer is crosslinked.

15. The process of claim 2 in which the support membrane is made of polyethylene and the modifying polymer is polyvinylalcohol.

16. The process of claim 15 in which the modifying polymer is crosslinked.

17. The process of claim 2 in which the support membrane is made of polypropylene and the modifying polymer is polyvinylalcohol.

18. The process of claim 17 in which the modifying polymer is crosslinked.

19. A process of claim 2 in which the support membrane is made of polypropylene and the modifying polymer is dextran having hydrophobic reactive groups thereon.

20. A process of claim 19 in which the modifying polymer is crosslinked.

21. A process of claim 2 in which the support membrane is made of polysulfone and the modifying is dextran having hydrophobic reactive groups thereon.

22. A process of claim 21 in which the modifying polymer is crosslinked.

23. A process of claim 2 in which the modified support membrane is further modified by binding a biologically active material to the modifying polymer.

24. A process of claim 23 in which the modifying polymer is crosslinked.

25. A process of claim 23 in which the modifying polymer is a crosslinked ionic polymer.

26. A process of claim 25 in which the biologically active material is a polypeptide.

27. A process of claim 25 in which the ionic polymer is DEAE dextran.

28. A process of claim 27 in which the support membrane is made of polysulfone.

29. A process of claim 2 in which the modifying polymer is ionic.

30. A process of claim 2 in which the modifying polymer is DEAE dextran.

31. A process of claim 2 in which the modifying polymer is DEAE dextran and the support membrane is polysulfone.

32. The process of claim 31 in which the polysulfone support membrane is substantially macro-void free.

33. A process of claim 2 in which the modifying polymer is DEAE dextran and the support membrane is polyethersulfone.

34. A process of claim 2 in which the support membrane is made of a polymer selected from the group consisting of polysulfone, polyethersulfone, polyetherimide, polypropylene and polyethylene.

35. A process of claim 34 in which the modifying polymer is blue dextran.

36. A process of claim 2 in which the support polymer is substantially macro-void free.

* * * * *